ively, the stud 3 and springs 6 on these bolts serve
UNITED STATES PATENT OFFICE.

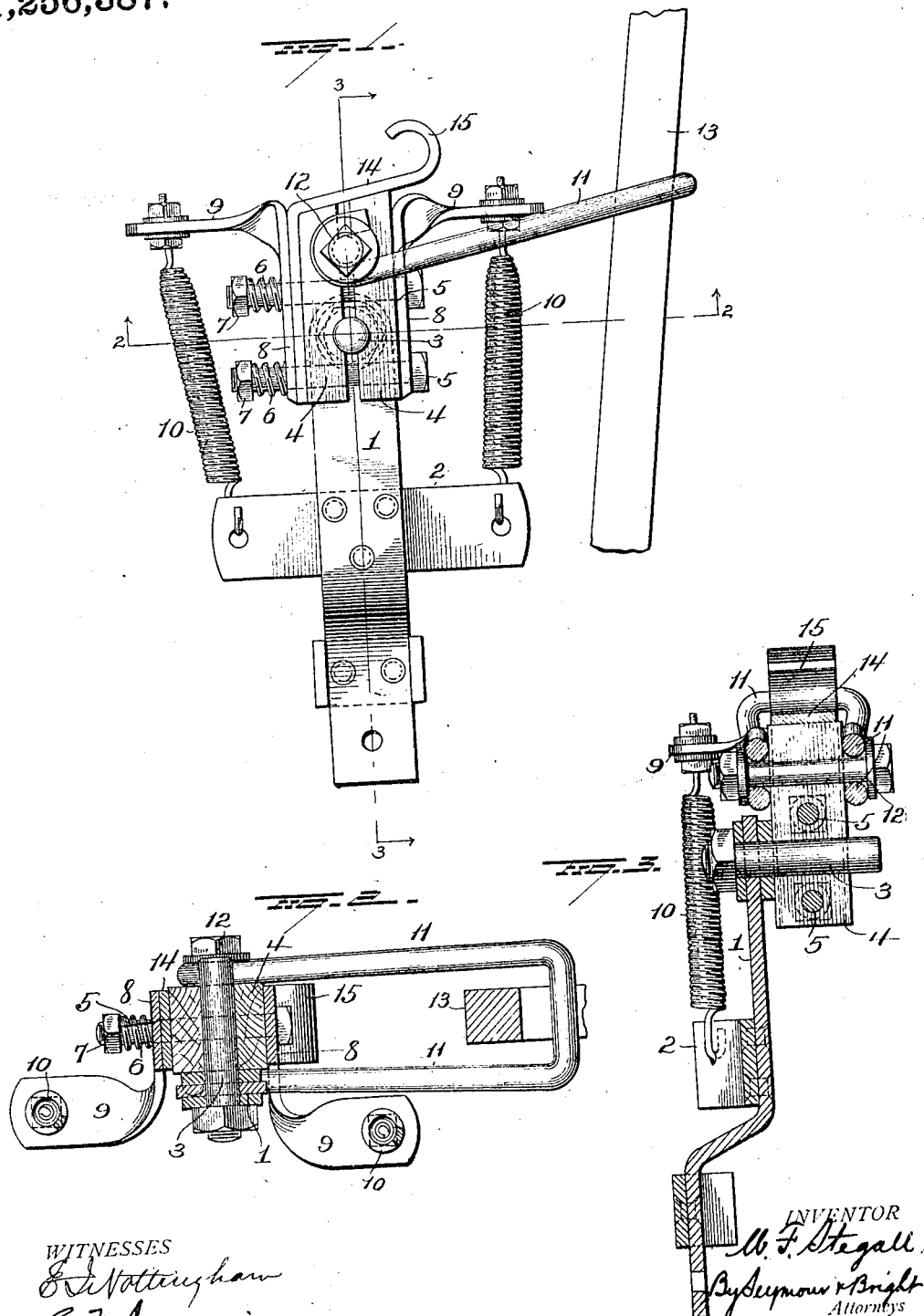

WALTER F. STEGALL, OF CONCORD, NORTH CAROLINA, ASSIGNOR OF ONE-HALF TO TOLA D. MANESS, OF CONCORD, NORTH CAROLINA.

CHECKING-MOTION FOR LOOMS.

1,256,387.  Specification of Letters Patent.  Patented Feb. 12, 1918.

Application filed August 3, 1917.  Serial No. 184,308.

*To all whom it may concern:*

Be it known that I, WALTER F. STEGALL, a citizen of the United States, and a resident of Concord, in the county of Cabarrus and State of North Carolina, have invented certain new and useful Improvements in Checking-Motions for Looms; and I do hereby declare the following to be a full, clear, and exact description of the invention, such as will enable others skilled in the art to which it appertains to make and use the same.

This invention relates to improvements in checking motions for looms—the object of the invention being to provide a checking mechanism wherein simple and efficient friction means shall be provided for properly checking the picker stick as the same approaches the end of its forward and also its return stroke.

A further object is to combine with the friction checking means, spring devices which shall operate to assist in starting the checking action and also to relieve the picker stick of jar so that the proper time of checking will be insured.

With these and other objects in view, the invention consists in certain novel features of construction and combinations of parts as hereinafter set forth and pointed out in the claims.

In the accompanying drawings, Figure 1 is an elevation showing an embodiment of my improvements. Fig. 2 is a section on the line 2—2 of Fig. 1, and Fig. 3 is a section on the line 3—3 of Fig. 1.

1 represents a bracket to be secured at its lower end to the foot portion of the loom (not shown) and this bracket comprises in its structure, an intermediate cross-bar 2.

A stud 3 is rigidly secured to the upper portion of bracket 1 and projects therefrom at right angles. Friction blocks 4, 4, preferably of wood, are disposed at respective sides of the stud 3 and made with grooves or recesses for the accommodation of said stud. Bolts 5, 5, pass through the pair of friction blocks above and below, respectively, the stud 3 and springs 6 on these bolts serve to cause the friction blocks to engage the stud with yielding pressure. One end of each bolt 5 may be provided with a head and its other end threaded to receive a nut 7, between which latter and the adjacent friction blocks, the spring 6 is disposed. It is apparent that by adjusting the nut 7 the tension of the springs 6 and the degree of pressure of the friction blocks against the stud may be adjusted.

Brackets 8 are secured to the respective friction blocks by means of the bolts 5 and are provided with laterally projecting arms 9, with which latter the upper ends of springs 10 are attached,—the lower ends of said springs being connected with the cross-bar 2 of the bracket 1.

A U-shaped loop or arm 11 has the inner ends of its respective members secured to the friction-blocks by means of a bolt 12 and suitable nuts and washers. This loop or arm projects laterally from its connection with the friction blocks and through it, the picker stick 13 passes.

A bumper arm 14 is secured by means of the bolts 5 to the friction blocks and its upper end (which may be somewhat curved as shown at 15) is disposed above said friction blocks and in the path of movement of the picker stick.

During the forward throw of the picker stick and as it approaches the end of such throw, said picker stick will engage the bumper and cause the friction blocks to turn on the stud 3 and thus offer frictional resistance to the further movement of said picker stick, the initial movement of the friction blocks being assisted by the action of one of the springs 10 and the jar to the picker stick will be thus relieved. When the picker stick makes its return throw, it will engage the closed outer end of the arm or loop 11 and thus cause the friction blocks to be returned to their normal position and at the same time offer frictional resistance to the picker stick,—the jar to the picker stick being relieved by the action of one of the springs 10 in the same manner as above explained. The springs 10 also serve to control the length of the check as well as the moment of the check.

With my improvements the movements of the picker stick will be effectually checked at respective ends of its throw without undue jar to said picker stick and the checking operations will be accurate.

Having fully described my invention what I claim as new and desire to secure by Letters-Patent, is:

1. In a checking mechanism for looms, the combination with a bracket and a stud thereon, of spring-pressed friction blocks disposed at opposite sides of said stud and engaging the same, and a bumper for a picker stick carried by said friction blocks.

2. In a checking mechanism for looms, the combinatioin with a bracket and a stud thereon, of spring-pressed friction blocks disposed at opposite sides and engaging said stud, a bumper carried by said friction blocks to be engaged by a picker stick, and an arm connected with said friction blocks to be engaged by the picker stick during the return throw of the same.

3. In a checking mechanism for looms, the combination with a bracket and a stud thereon, of friction blocks engaging said stud, means for adjusting the tension of said friction blocks against the stud, a bumper carried by the friction blocks to be engaged by a picker stick, and a looped-arm connected with the friction blocks and adapted to receive the picker stick for returning the friction blocks during the return throw of said picker stick.

4. In a checking mechanism for looms, the combination with a bracket and a stud thereon, of friction blocks engaging said stud, means carried by the friction blocks for engagement of a picker stick, arms on the respective friction blocks, and springs connecting said arms with the bracket at respective sides of the planes of said friction blocks and stud.

5. In a check mechanism for looms, the combination with a bracket having a cross-head, and a stud above said cross-head, of friction blocks engaging the stud, bolts passing through the friction blocks above and below the stud respectively, nuts on said bolts, springs interposed between said nuts and one of the friction blocks, a bumper secured to the friction blocks to receive a picker stick at the forward end of its throw, a looped arm secured to the friction blocks to receive the picker stick during its return throw, laterally projecting arms secured to the friction blocks, and springs secured to said arms and to the respective end portions of the cross-head of the bracket.

In testimony whereof, I have signed this specification in the presence of two subscribing witnesses.

WALTER F. STEGALL.

Witnesses:
JOHN A. PATTERSON,
W. J. WEDDINGTON.